(12) United States Patent
Mahrouq

(10) Patent No.: US 11,521,239 B2
(45) Date of Patent: Dec. 6, 2022

(54) VEHICLE INVENTORY AND ADVERTISEMENT CAMPAIGN SYSTEM

(71) Applicant: Sam Mahrouq, Arlington, TX (US)

(72) Inventor: Sam Mahrouq, Arlington, TX (US)

(73) Assignee: VBI GROUP, INC., Arlington, TX (US)

( * ) Notice: Subject to any disclaimer, the term of this patent is extended or adjusted under 35 U.S.C. 154(b) by 128 days.

(21) Appl. No.: 16/859,697

(22) Filed: Apr. 27, 2020

(65) Prior Publication Data
US 2021/0334853 A1    Oct. 28, 2021

(51) Int. Cl.
| | |
|---|---|
| G06Q 30/02 | (2012.01) |
| G06K 9/62 | (2022.01) |
| G07C 5/08 | (2006.01) |
| G07C 5/00 | (2006.01) |

(52) U.S. Cl.
CPC ....... *G06Q 30/0266* (2013.01); *G06K 9/6215* (2013.01); *G06Q 30/0241* (2013.01); *G06Q 30/0242* (2013.01); *G07C 5/008* (2013.01); *G07C 5/0841* (2013.01)

(58) Field of Classification Search
None
See application file for complete search history.

(56) References Cited

U.S. PATENT DOCUMENTS

| | | | |
|---|---|---|---|
| 8,442,558 B2 | 5/2013 | Mader et al. | |
| 8,676,151 B2 | 3/2014 | Mader et al. | |
| 8,719,094 B1* | 5/2014 | Klein | G06Q 30/0255 |
| | | | 705/14.53 |
| 8,750,904 B2 | 6/2014 | Mader et al. | |
| 9,020,690 B2 | 4/2015 | McKown et al. | |
| 9,024,739 B2 | 5/2015 | McKown et al. | |
| 9,290,145 B2 | 3/2016 | Mader et al. | |
| 10,482,801 B2 | 11/2019 | Mader et al. | |
| 10,522,061 B2 | 12/2019 | Mader et al. | |
| 10,529,264 B2 | 1/2020 | Mader et al. | |
| 10,657,739 B2 | 5/2020 | Mader et al. | |
| 2004/0036622 A1* | 2/2004 | Dukach | G06Q 30/02 |
| | | | 340/691.6 |
| 2011/0078024 A1* | 3/2011 | Messier | G06Q 30/02 |
| | | | 705/14.63 |
| 2014/0058618 A1* | 2/2014 | Rude | G06Q 30/02 |
| | | | 701/31.4 |
| 2015/0123822 A1* | 5/2015 | Hatton | G08B 25/016 |
| | | | 340/989 |
| 2015/0254719 A1* | 9/2015 | Barfield, Jr | G06Q 30/0273 |
| | | | 705/14.53 |

OTHER PUBLICATIONS

Lu et al., "A Context-Aware Budget-Constrained Targeted Advertising System for Vehicular Networks," in IEEE Access, vol. 6, pp. 8704-8713, 2018 (Year: 2018).*

* cited by examiner

*Primary Examiner* — Christopher B Tokarczyk

(57) ABSTRACT

The disclosed is an event-triggered advertisement communication system for vehicles and vehicle dealerships. In some embodiments, an advertising communication system may be configured to provide an advertisement campaign to a user designed to respond to certain events the user experiences in real-time. In some embodiments, the inventory advertisement management system may be designed to: (1) track whether the device is located within a predetermined perimeter; (2) provide current inventory attribute status associated the device; and (3) send advertisement campaigns to the user depending on attribute and location perimeters.

7 Claims, 4 Drawing Sheets

VEHICLE INVENTORY AND ADVERTISEMENT CAMPAIGN SYSTEM

FIELD OF THE INVENTION

The present technology relates to electronic communications. More particularly, the present technology relates to techniques for generating text messaging advertisement campaigns for automobile dealerships for their customers that are individualized for vehicle and personal behavior patterns.

BACKGROUND OF THE INVENTION

Inventory and advertisement management methods and technologies are rapidly changing due to the high demand for efficient inventory and advertisement systems throughout the world. Inventory systems allow for companies to accurately monitor designated attributes of specific products that they sell. Advertisement systems are designed to create advertising campaigns to target and send advertisements to a specific group of people or individual to offer discounts, coupons, product details, or other messages from the company that initiated the campaign. There is a need in the industry for advertisement systems that work in conjunction to allow businesses and customers to manage advertising campaigns while responding to inventory triggers, vehicle attributes, and learned behavior.

Individuals are regularly exposed to advertising and advertisement campaigns throughout their daily life. Internet use typically comes with innumerable advertisements provided with advertisement systems responding to specific inventory triggers. Outlets and certain businesses that share location permissions with a user's telephone device may display advertisements upon arrival to a location. Specific purchases allow for targeted advertisement to the user or a specific trigger may cause a particular advertisement to be sent to a customer through a designated medium, such as a nearby electronic display screen, a Facebook ad, or a text message.

In this application, "user" means both human users of the inventory and advertisement management system and, potentially, other software systems that are integrated with and leverage the functionality contained within the inventory management system.

Automobile dealerships use inventory systems to monitor how many cars are in a lot, the make and models, selling price, etc. When a customer purchases a car and drives it off the lot that particular car is no longer included in the dealer's current inventory and can no longer be monitored. Automobile dealerships and manufacturers use many different advertising systems to market their automobile to consumers, e.g., internet sites, television, billboards, and radio. Many modern automobiles include systems that monitor automobile attributes and can trigger an alert to its driver of the condition and offer solutions based on the trigger, such as a Mercedes alerting the driver that the vehicle is low on fuel and offering directions on the in-car navigation system to the nearest fueling station.

There is a need in the automobile industry for an individualized advertising system that monitors the attributes of a customer's automobile to trigger specific advertisement campaigns for the driver, depending on the attribute triggered.

While the embodiment expressed in this application is specifically targeted to vehicle sales and operation, the invention is not limited any one of these embodiments.

SUMMARY OF THE INVENTION

The present invention is a communication device programmed to monitor an automobile and send automated personalized text messages to the user of the automobile when prompted by the automobiles condition triggers, conditioned on location of the vehicle, past behavior, and surrounding businesses which can resolve triggers.

Other features and advantages of the present disclosure will be apparent to those of ordinary skill in the art upon reference to the following detailed description taken in conjunction with the accompanying drawings.

DETAILED DESCRIPTION OF THE INVENTION

For a better understanding of the disclosure, and to show by way of example how the same may be carried into effect, reference is now made to the numbered elements and detailed description.

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprises" and "comprising", when used in this specification, specify the presence of stated features, steps, operations, elements, and components, but do not preclude the presence or addition of one or more other features, steps, operations, elements, components, or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that several techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention and is not intended to limit the invention to the specific embodiments illustrated by the figures or description below.

Figure 1:
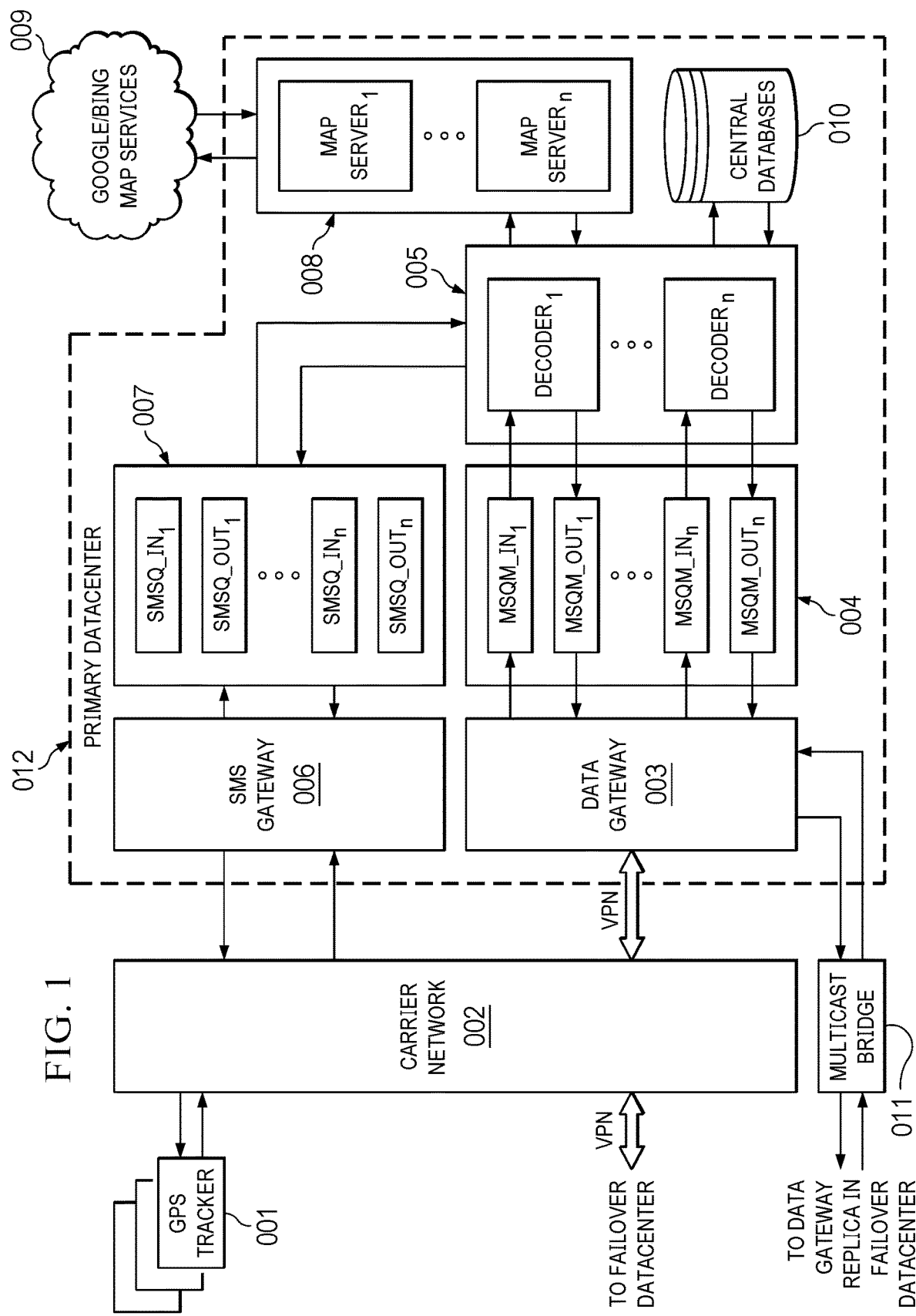
FIG. 1 is the back-end systems flowchart.

FIG. 1 shows a block diagram which includes a GPS location, SMS messaging system, map, and database systems, w according to an exemplary embodiment of the inventive concept.

001: GPS trackers are installed in customers' vehicles to collect GPS data, e.g., latitude, longitude, altitude, heading, speed, and send the information back to the back-end server via a carrier network.

002: The carrier network provides data and SMS services for the communication between the GPS trackers and the back-end system. The data is sent and received securely through one or more Virtual Private Network (VPN) tunnels established between the carrier network and the datacenters. In the current embodiment, there are at least two VPN connections to provide failover at the datacenter level.

003: The gateway that sends and receives messages to and from the GPS trackers. The incoming messages are placed in the IN queues, using Microsoft Message Queues (MSMQs) 004, and wait to be processed by the corresponding decoders 005 when they become available. Similarly, the outgoing messages are queued at the OUT MSMQs to be sent to the corresponding GPS trackers.

004: The queues for incoming and outgoing messages.

005: Decoders that decode received and sent messages from and to the GPS trackers. The decoded GPS coordinates are sent to the map servers 008, which provide reverse geocoding to be converted into a location. The decoded information from the GPS trackers is then stored in the central databases 010.

006: The gateway receives and sends SMS messages from and to the GPS trackers, which provides another way to communicate with the GPS trackers.

007: The queues for incoming and outgoing SMS messages.

008: The map servers provide reverse geocoding service, converting GPS coordinates into a location. Upon the receipt of the GPS coordinates, a map server first checks the local cached map to see if a match exists between the vehicle location and a geographically relevant location. If the map server finds a match, the corresponding location is sent back to the requesting decoder, otherwise the map server will get the location information from a map service provider 009, e.g., Google or Bing. The current embodiment includes a GPS-equipped vehicle that reports the coordinates of the vehicle every two minutes and compares the location path with Google Maps, thereby charting the path of the vehicle.

009: The map service from an internet source, such as Google or Bing.

010: The central databases are used as the data store w for the back-end system and front-end applications and APIs and other services.

011: The multicast bridges sends and receives messages to and from the other data gateway replica to provide the failover at the application level.

012: The datacenter hosts the back-end system and databases.

Figure 2:
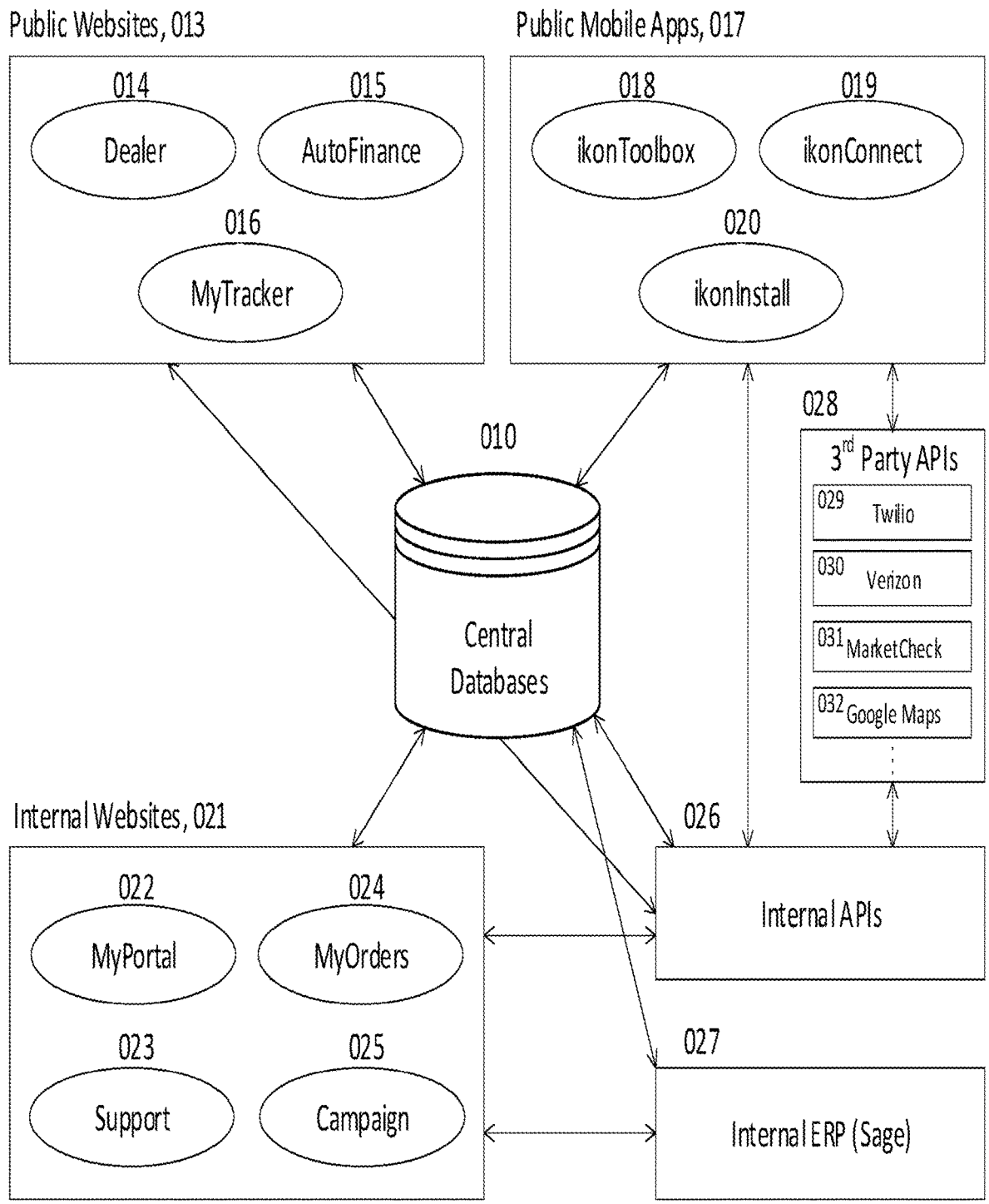
FIG. 2 is the front-end applications flowchart.

FIG. 2 is a block diagram showing a front-end applications and example APIs and services according to an exemplary embodiment of the inventive concept.

010: The central databases are used as the data store for the back-end system and front-end applications and APIs and services. Each time a vehicle is turned off, it sends a report to this database in the current embodiment. An alternative application of the program might keep track of the time during which the vehicle is operated and if more than a specified time has passed in operation, the system can provide an update to determine an unusual traffic pattern or longer-than-usual trip.

013: The public websites allow customers to manage their vehicles and fleets.

014: The website for automobile dealers allows them to manage their vehicles and fleets.

015: The website for "buy here, pay here" (BHPH) dealers allows them to manage their vehicles and fleets.

016: The website for individual customers allows them to manage their vehicles.

017: The public mobile apps to allow customers to manage their vehicles and fleets.

018: The mobile app for New Car dealers allows them to manage their vehicles and fleets.

019: The mobile app for BHPH dealers which allows them to manage their vehicles and fleets.

020: The mobile app which allows customers to enter the vehicle information easily when installing the GPS trackers in vehicles.

021: The internal websites allow dealerships to manage customer vehicles, user accounts, orders, set up and send advertising campaigns and messages.

022: The website which allows dealers to manage customer vehicles and provides support services for the GPS trackers and vehicles, as well as the internal information.

023: The website to manage customer vehicles, companies and groups, user accounts, service and billing plans.

024: The website to manage customer orders.

025: The website that allows dealerships to send messages to the customers that have tracking devices installed. This website pushes messages to a driver, owner, or operator upon satisfaction of event conditions, as programmed.

026: The internal APIs which provide services for internal websites, public websites and mobile apps.

027: The system includes an enterprise resource planning (ERP) database (currently provided by Sage) and interface for managing product inventory, creating user accounts for MyOrders, and handling various ERP related functions.

028: The third-party APIs that provide services for internal websites, public websites, mobile apps, and internal APIs. This embodiment is not limited to the example of third party APIs provided. The following paragraphs describe the current providers in the embodiment as it is operated.

029: In the current embodiment, a cloud communications platform (provided by Twilio as the system is built at this filing) provides APIs that allows sending SMS to customers.

030: In the current embodiment, information about billing plans, device states, data usage, and changes to device states (activated, suspended, deactivated, for example) is provided through Verizon APIs.

031: In the current embodiment, vehicle information to the Toolbox application is provided by MarketCheck.

032: In the current embodiment, the location of vehicles is determined through a Google Maps API.

Figure 3:
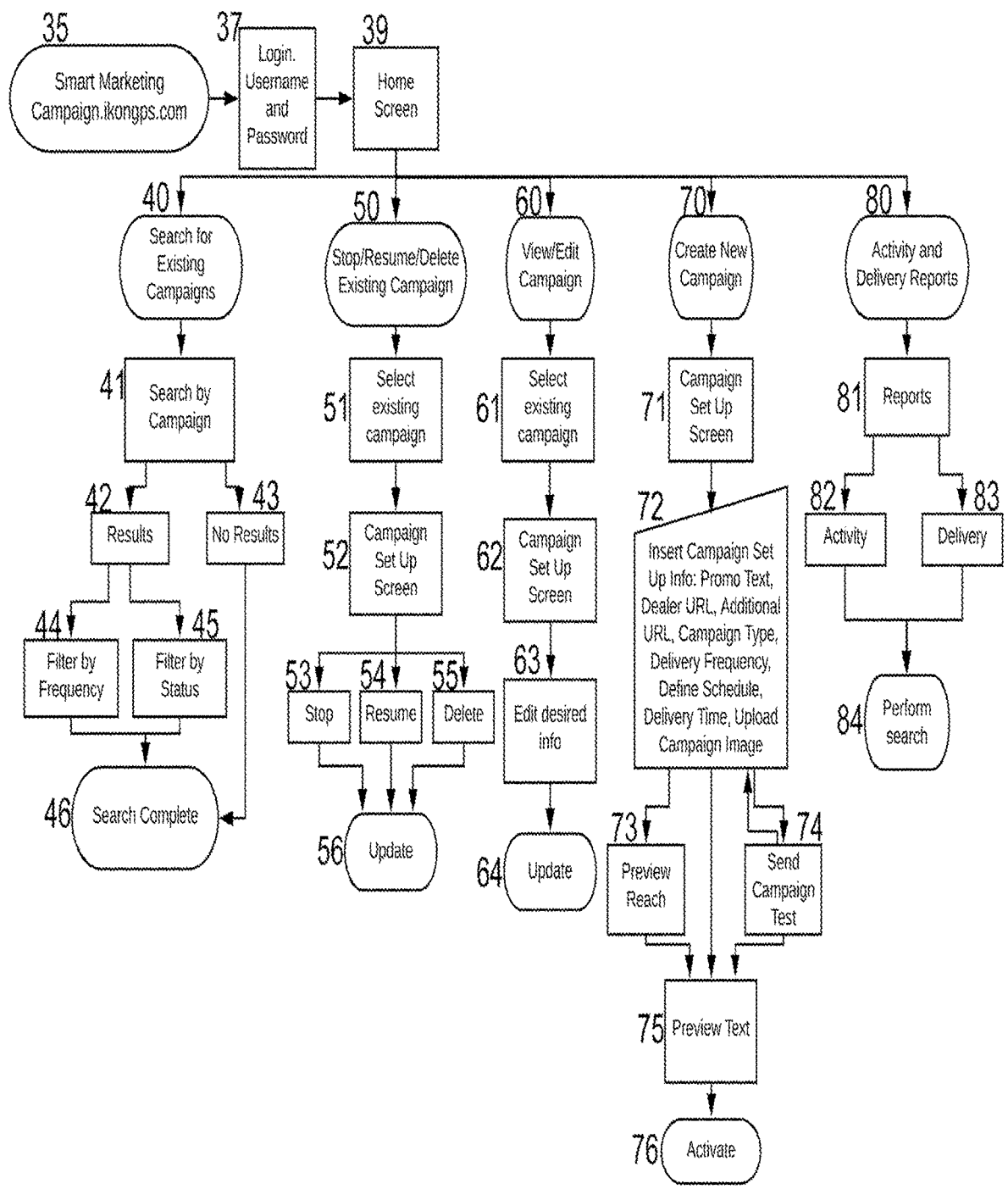
FIG. 3 is the smart marketing flowchart.

FIG. 3 is a block diagram showing the Smart Marketing campaign process for managing user on a host website and systems according to an exemplary embodiment of the inventive concept. The arrows between the indicated blocks show the general direction of a user's progress through use of the application's subroutines and process screens, but a user can go back and forth between each connected step or subroutine of the application to obtain the desired campaign structure and operation. The terms "application", "routine", and "subroutine" are used to indicate specific steps or processes, but are used for readability and do not intend to indicate a hierarchy except from context.

35: This block marks the application's beginning, starting with the Smart Marketing Campaign abilities as described herein.

37: The login screen allows the user to enter a username and password provided.

39: The Smart Marketing home screen allows a user to create a new campaign, view existing campaigns, search for existing to campaigns, view reports, and log out. The present embodiment uses SMS messaging text campaigns.

As used in this application, references to a 'text campaign' are a reference to the use of text messages usually containing marketing material, coupons, or sales reminders provided through third party-advertisement companies and sent to a pool of individual members in the advertising company's database based on predefined rules.

From the home screen a user may view the frequency, status, and count of campaign messages sent or failed.

To create a new campaign, a user selects the "New Campaign" 70 option on the Home Screen 39, which allows a user to choose to Create a New Campaign 70, which leads to a Campaign Set Up Screen 71, where the user steps through defining the campaign.

In the step referenced as "Insert Campaign Set up Info" 72, the user enters information into a variety of fields. Examples include: Promo Text, Dealer URL, Additional URLs, Campaign Type, Delivery Frequency, Define Schedule, Delivery Time, and Upload Campaign Image. Several of these fields are defined further.

A campaign's Promo Text includes the body of the sms text message, allowing up to a predefined number of characters. The Dealer URL features a URL link of the Dealer's website sent to the receiving members. Additional URLs features an additional specified URL link sent to the receiving members.

In the present embodiment, a user can have a predefined campaign or a custom campaign type. A predefined campaign type consists of a list of predefined rules for the query, as opposed to a custom campaign type which allows the user to build a custom query.

Delivery Frequency allows a user to set the campaign messaging to repeat at a user-set frequency, or sent once, where the user can run a SMS campaign a single time. A user can also define a schedule, selecting specific dates where the user can run a campaign. The user can also define a specific delivery time to deliver the campaign message to the customer. The user may also have the option to upload a campaign image that will be displayed in the campaign message.

After defining a specific campaign, a user can perform a Send Campaign Test 74 to preview a message sent to a specified receiver.

Additionally, a user can use a Preview Reach 73 application to view the number of customers which match the specified campaign type, calculated by filtering through stored w customer data stored in the back-end of the application based on the user-predefined rules.

After a user has set up a campaign, he can perform a Preview Text 75 function to view what customers will see when they receive the text before the user activates the campaign. If the user is not satisfied with the campaign they can edit the campaign properties and test until they are satisfied.

Once satisfied that a campaign is constructed properly, the user can proceed to Activate 76 and the campaign begins.

In this embodiment a user can view all existing campaigns listed on the Home 39 screen. By selecting an existing campaign name, the user has the ability to View/Edit the Campaign 60. If the user Selects Existing Campaign 61, he can then from the Campaign Set Up Screen 62 amend the campaign by an Edits Desired Info 63 process.

Once all desired changes have been made and information entered, the user finalizes the changes by utilizing the 64 Update subroutine.

A user can control a defined campaign by use of the Stop/Resume/Delete Existing Campaign 50 subroutine. In this embodiment a user would Select Existing Campaign 51 on the Home Screen 50 and then from the Campaign Set Up Screen 50 choose to Stop 53, Resume 54, or Delete 55 a campaign.

A user wishing to stop a specific campaign they can select the Stop 53 function and the subject campaign can be stopped, either for a period of time or indefinitely. A user wishing to continue a defined campaign can select Resume 54 from the Campaign Set up Screen 52. Finally, a user wishing to eliminate as an option the campaign can choose the Delete 55 option. In the current embodiment, a user cannot reinstate ore regain a deleted campaign.

From the Home Screen 39, a user can choose to locate a specific existing campaign by using the Search for Existing Campaigns 40 routine. The user can input search criteria into the Search by Campaign 41 field, and from that input, the application gives a list of Results 42 or a null result reported as No Results 43.

After the search results have been populated a user can Filter by Frequency 44, for example such as ongoing campaign or paused campaigns, and Filter by Status 45, for example such as scheduled campaigns, finished campaigns, or canceled campaigns. After the user completes the search process, the results are displayed and the search routine is finished as indicated with Search Complete 46 block.

From the Home Screen 39, a user can select an option to access the Activity and Delivery Reports 80. Upon such selection, a user can view all Reports 81 showing all activity occurring within all campaigns. The report of Activity 82 includes such information as the time of activity, the user associated with the activity, all actions taken, accumulated data, and the status of the action. A user can also view a report of Delivery 83 report showing all of the campaign messages delivered as a result of an active SMS campaign, including such information as cell phone numbers receiving messages from the campaign, send date, status of the messages, and campaigns associated. From this subroutine, a user and repeat the Perform Search 84 to evaluate different campaigns.

Figure 4:
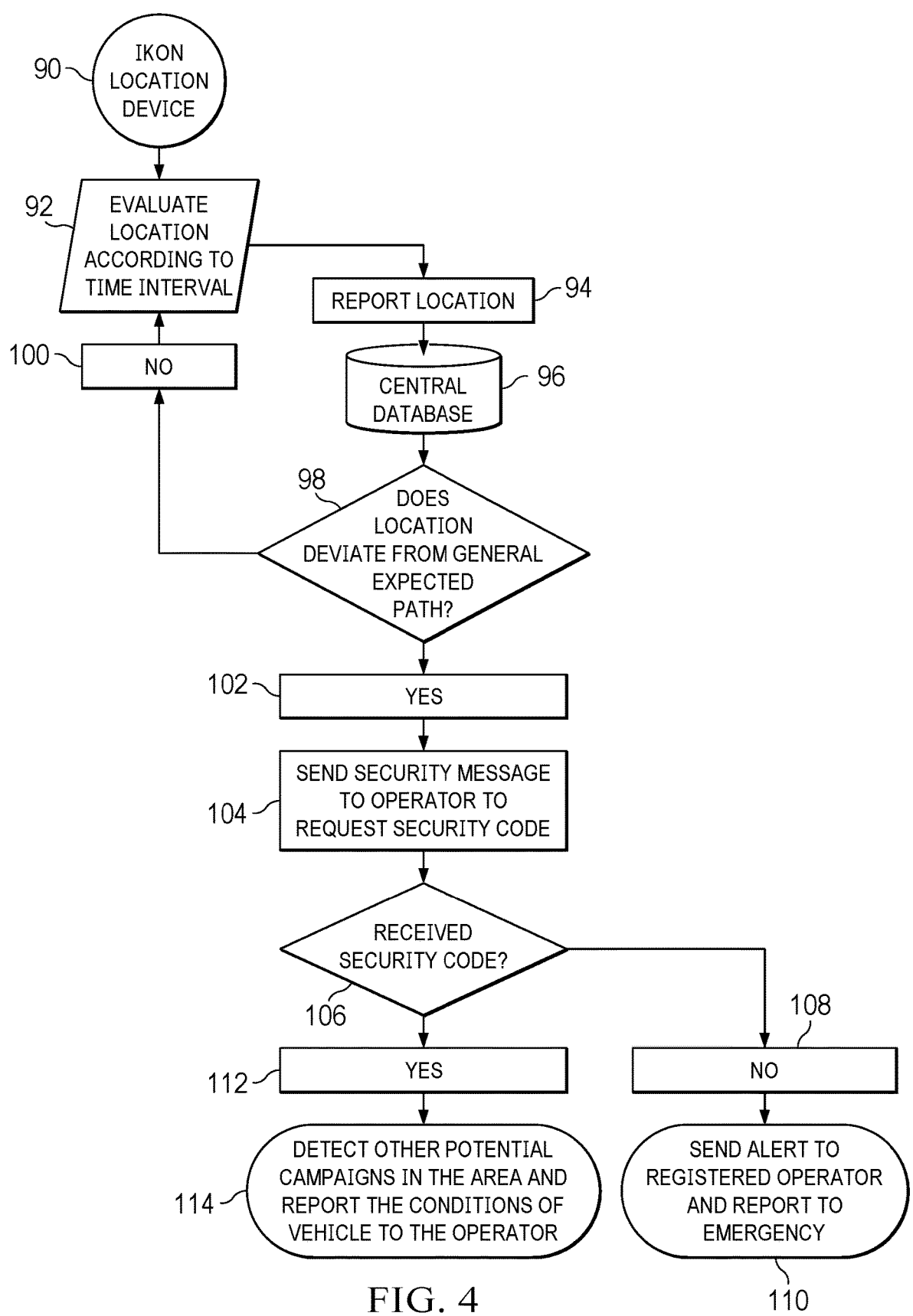
FIG. 4 is a flowchart for emergency and anomalous travel pattern operation.

FIG. 4 describes a process by which the system as described can also be used to monitor a vehicle and detect changes from a pattern to determine a potential theft or vacation trip, and trigger a different ad campaign or safety check. For example, in the current embodiment, the location device 90 evaluates the vehicle location 92 every two minutes, and reports the location 94 the central system 96. The system can track daily trips over a week to determine a general expected path over a period of time. Once established, the central databases 96 will compare the reported location of the vehicle to the general expected path 98. If the trip does not deviate from the general expected path 100 the system will continue to evaluate the vehicle location according to the time interval chosen 92. If a trip deviates from the daily expected path 102 by taking more than twice the usual travel time, or outside an expected geographic envelope of movement, the system can send a security message to the operator and require a security code 104. The system will wait a pre-determined amount of time to receive the security code 106. If the operator does not enter the pre-determined passcode 108, the messaging system can alert an operator or emergency contact as pre-defined by the user 110, providing that third party of the vehicle identification, location, owner or operator, and other vehicle operating conditions as defined by the user, and can report to police or other agents of the state the vehicle location to intercept the stolen vehicle.

If the system does receive the security code 112 the system can revise the campaign advertising directed to a user based on a vehicle that is traveling outside its usual pathways, as in a vacation or work trip. The system can detect potentially other advertising campaigns which may be in effect in a different city or automatically check operating conditions of the vehicle which may be more significant during a trip 114, such as air pressure in a vehicle that might otherwise not be reported more often than once a week.

This messaging system is therefore not limited to an advertising campaign system alone, but can assist a user in safe travel and theft detection.

The invention claimed is:

1. A messaging system comprising:
   a means of tracking a location of a vehicle;
   a means of periodically reporting movements of the vehicle to an application operating on a computer;
   a messaging application which sends a message to a vehicle operator when chronological periodic reports of the vehicle match a user-defined set of criteria;
   a means of providing to an application's manager a report of a status of messages which have been sent;
   a means of tracking a plurality of trips taken by the vehicle over a period of time to create a characteristic daily cycle for the vehicle, the characteristic daily cycle defined by at least a user-determined set trip period and an expected geographic envelope of movement created based on the tracking of the plurality of trips, and of recognizing a vehicle movement path which deviates from the characteristic daily cycle by at least one of traveling for a longer time than the user-determined set trip period and traveling outside the expected geographic envelope of movement;
   a means of reporting the deviating vehicle movement path to a messaging operation, the messaging operation alerting an operator or emergency contact as defined by a user; and
   a means of reporting to a third party of a vehicle identification, location, owner or operator, and other vehicle operating conditions as defined by the user.

2. The messaging system of claim 1, additionally comprising:
   the means of periodically reporting the movements of the vehicle further configured to periodically report at least one vehicle operating condition to the application; and
   the messaging application further configured to send a message to the vehicle operator when the chronological periodic reports of the vehicle or vehicle operating conditions match the user-defined set of criteria.

3. The messaging system of claim 2, further configured to send a message to the vehicle operator when the chronological periodic reports of the vehicle and the vehicle operating conditions match the user-defined set of criteria.

4. The messaging system of claim 3, further configured to send a message to the vehicle operator when the chronological periodic reports of the vehicle and the vehicle operating conditions match the user-defined set of criteria, such criteria potentially including proximity to one or more geographic locations.

5. The messaging system of claim 2, further configured so a user can operate sets of messaging applications capable of sending multiple messages to multiple vehicle operators.

6. The messaging system of claim 2, in which a means of periodically reporting to the messaging application includes in its reports at least one vehicle operating condition obtained through an onboard vehicle diagnostic system of the vehicle.

7. The messaging system of claim 4, further configured so a user can edit the criteria which is compared to either at least one vehicle operating condition, periodic report, or geographic location.

* * * * *

UNITED STATES PATENT AND TRADEMARK OFFICE
CERTIFICATE OF CORRECTION

| | |
|---|---|
| PATENT NO. | : 11,521,239 B2 |
| APPLICATION NO. | : 16/859697 |
| DATED | : December 6, 2022 |
| INVENTOR(S) | : Husien K. Mahrouq |

It is certified that error appears in the above-identified patent and that said Letters Patent is hereby corrected as shown below:

On the Title Page

Item (72), Line 1, "Sam Mahrouq" should read -- Husien K. Mahrouq --.

Signed and Sealed this
Twelfth Day of November, 2024

Katherine Kelly Vidal
*Director of the United States Patent and Trademark Office*